US005501882A

United States Patent [19]

Shukushima

[11] Patent Number: 5,501,882

[45] Date of Patent: Mar. 26, 1996

[54] METHOD OF MAKING HEAT-RESISTANT COATED ELECTRICALLY CONDUCTIVE WIRE

[75] Inventor: Satoshi Shukushima, Osaka, Japan

[73] Assignee: Sumitomo Electric Industries, Ltd., Osaka, Japan

[21] Appl. No.: 415,993

[22] Filed: Apr. 4, 1995

Related U.S. Application Data

[62] Division of Ser. No. 280,672, Jul. 27, 1994, Pat. No. 5,492,761, which is a continuation of Ser. No. 942,334, Sep. 9, 1992, abandoned, which is a continuation of Ser. No. 520,139, May 8, 1990, abandoned, which is a continuation-in-part of Ser. No. 435,835, Nov. 14, 1989, abandoned.

[30] Foreign Application Priority Data

Jan. 27, 1989 [JP] Japan .................................... 1-18600

[51] Int. Cl.$^6$ ................................ B05D 3/00; C08J 7/18

[52] U.S. Cl. ...................... 427/496; 427/117; 427/385.5; 427/388.1; 427/388.2; 427/508; 427/553

[58] Field of Search .................................. 427/551, 553, 427/117

[56] References Cited

U.S. PATENT DOCUMENTS

| | | | |
|---|---|---|---|
| 2,940,869 | 6/1960 | Graham | 427/551 |
| 3,090,698 | 5/1963 | Wilson | 427/551 |
| 3,101,275 | 8/1963 | Cairns et al. | 427/551 |
| 3,373,226 | 3/1968 | Gowan | 260/874 |
| 3,826,573 | 7/1974 | Heinzer | 355/133 |
| 4,521,485 | 6/1985 | Tondre et al. | 428/383 |
| 4,544,725 | 10/1985 | Priola et al. | 526/301 |
| 4,726,993 | 2/1988 | Zaopo | 428/379 |
| 4,879,338 | 11/1990 | Mercer et al. | 524/508 |
| 5,332,625 | 7/1994 | Dunn et al. | 428/409 |

FOREIGN PATENT DOCUMENTS

| | | | |
|---|---|---|---|
| 584725 | 10/1959 | Canada | 427/551 |
| 2638763 | 1/1978 | Germany . | |
| 47-25951 | 7/1972 | Japan . | |
| 2-250209 | 10/1990 | Japan . | |
| 816024 | 7/1959 | United Kingdom | 427/551 |
| 88/090-1 | 11/1988 | WIPO . | |

*Primary Examiner*—Patrick J. Ryan
*Assistant Examiner*—J. M. Gray
*Attorney, Agent, or Firm*—Wenderoth, Lind & Ponack

[57] ABSTRACT

A method of making a heat-resistant coated electrically conductive wire is provided. The method involves forming an insulating coating of one or more thermoplastic resins containing aromatic rings or complex rings which are not cross-linkable alone by electron beams. Exemplary resins are polyetheretherketone, polyamide, polyetherimide, polyallylate, polycarbonate and polysulfone. The method then involves subjecting the insulating coating to irradiation with an accelerated ion beam, which cross-links the resin or resins. The energy of the accelerated ion beam is in a range of 0.1 MeV to 50 MeV, and the dose of the accelerated ion beam is in a range of $1\times10^{11}$ ions/cm$^2$ to $1\times10^{15}$ ions/cm$^2$.

1 Claim, No Drawings

METHOD OF MAKING HEAT-RESISTANT COATED ELECTRICALLY CONDUCTIVE WIRE

This is a divisional application of Ser. No. 08/280,672, filed Jul. 27, 1994 now U.S. Pat. No. 5,492,761, which was a continuation of now abandoned application, Ser. No. 07/942,334, filed Sep. 9, 1992, abandoned, which was a continuation of now abandoned application, Ser. No. 07/520,139 filed on May 8, 1990, which was a continuation-in-part of now abandoned application Ser. No. 07/435,835 filed Nov. 14, 1989.

BACKGROUND OF THE INVENTION

1. Field of the Invention

The present invention relates to a heat-resistant coated electrically conductive wire such as an engineering plastic electric wire.

2. Prior Art

Although in general a cladding layer of an electric wire is formed of polyethylene resins and polyvinyl chloride resins, since these resins have low melting points of about 100° C., a disadvantage has occurred in that the insulating layer is melted and contracted when exposed to heat.

DESCRIPTION OF THE RELATED ART

In order to eliminate this disadvantage, in the case where the cladding layer is formed of polyethylene resins and polyvinyl chloride resins as shown, for example, in the publication of the examined Japanese Patent Application No. 55-23300, an electric wire has been clad with these resins and then cross-linked by the irradiation of electron beams and other chemical methods to form an insulating layer having an improved thermal deformability.

On the other hand, for an electric wire used in fields requiring a still higher heat resistance, a cladding layer of an electric wire has been formed of engineering plastics having a higher heat resistance, for example polyetheretherketone (PEEK), polyphenylene sulfide (PPS) and the like.

However, since the heat-resistant engineering plastics are generally aromatic polymers, they are not cross-linked even if they are irradiated with electron beams.

Accordingly, engineering plastic electric wires clad with engineering plastics can not be improved in thermal deformability by the irradiation of electron beams as electric wires clad with polyethylene resins and polyvinyl chloride resins.

In addition, a problem has occurred also in that the higher the heat-resistant temperature, the more expensive the engineering plastics, thus the material cost is high.

SUMMARY OF THE INVENTION

The present inventor has achieved the present invention as a result of the investigation aimed at improving the electric wire clad with the engineering plastics in thermal deformability in view of the above described matter.

That is to say, the present invention provides a heat-resistant coated electrically conductive wire having an improved thermal deformability by forming an insulating layer of thermoplastic resins including aromatic rings or complex rings in a molecule and cross-linking said insulating layer by irradiating it with ion beams by the use of ions having an energy larger than 0.1 MeV.

Even though the polymers including aromatic rings or complex rings in a molecule are irradiated with electron beams, they are not cross-linked but they can be cross-linked when irradiated with ion beams.

It can be judged by a gel-fraction whether the cross-linking is brought about or not.

For example, even though polyetherimide is irradiated with electron beams in a dose of 72 Mrad, no gel is formed but when it is irradiated with ion beams by the use of $He^+$ ions of 1 MeV in a dose of $1\times10^{14}/cm^2$, the gel-fraction reached 70%.

The reason why polymers including aromatic rings or complex rings in a molecule, which are not cross-linked by irradiating with electron beams, are cross-linked by irradiating with ion beams is that the energy given to a unit volume by irradiating with ion beams is remarkably larger (several thousand times) than that by irradiating with electron beams, so that a ring-opening, which is not produced by irradiating with electron beams, is produced by irradiating with ion beams.

And, the cross-linking leads to the formation of a net-structure, in which molecules are arranged three-dimensionally, so that the thermal deformability is improved.

DESCRIPTION OF THE PREFERRED EMBODIMENTS

Although $H^+$, $He^+$, $N^+$, $Ar^+$ and like ions can be used in the ion beam irradiation treatment of the insulating layer, the ion beam irradiation treatment is not limited to use of these kinds of ions. However, the smaller the mass of the ions, the longer the penetrating distance of the ion beams. Ions having a smaller mass are thus suitable for irradiating an electric wire provided with an insulating layer, particularly an insulating layer having a large thickness.

If the energy of the ion beams is smaller than 0.1 MeV, the ions are stopped on the surface, so that the coating layer cannot be cross-linked, and the thermal deformability of the coating layer cannot be improved. If the ion beam energy is larger than 50 MeV, the coating layer is deteriorated by the ion beams to lower the mechanical strength of the electric wire, so that an ion beam energy larger than 50 MeV is undesirable. Thus, a range from 0.1 MeV to 50 MeV is suitable.

The dose of the ion beams to be used should be $1\times10^{11}/cm^2$ to $1\times10^{15}/cm^2$, preferably $1\times10^{12}/cm^2$ to $5\times10^{14}/cm^2$.

If the dose is smaller than $1\times10^{11}/cm^2$, cross-linking of the coating is not effected, and an improvement in heat resistance can not be achieved, while if the dose is larger than $1\times10^{15}/cm^2$, a deterioration of the coating layer occurs, and the strength of the coating is lowered.

In the case of the insulating layer using polymers whose elongation properties are reduced by ion beam irradiation, the heat resistance of the coating layer can be improved without lowering the mechanical strength of the coating, by irradiating only the surface of the coating to improve the heat resistance, while not irradiating the inner portion of the coating layer so as to maintain the elongation properties of the coating. In such case, a shorter range ion beam is used which penetrates to a depth less than the thickness of the insulating coating.

For example, polyamide, polyetherimide, polyallylate, polycarbonate, polyphenylene oxide, and polysulfone can be used as the thermoplastic resins, which contain aromatic rings or complex rings in the molecule thereof.

A PREFERRED EMBODIMENT

An electric wire coated with polyallylate resins at a thickness of 50 μm as the insulating coating layer was irradiated with $He^+$ ions of 3 MeV in a dose of $1\times10^{14}/cm^2$.

Subsequently, it was confirmed that the gel-fraction measured by dimethylformamide (DMF) was 65% and the cross-linking was brought about by the irradiation of ion beams.

In addition, this electric wire was immersed in solder at 310° C. for 5 seconds with no change in shape.

On the other hand, a polyallylate-clad electric wire which has not been irradiated with ion beams, was similarly immersed in the solder with the results that the coating layer was melted and the coating of the electric wire was contracted.

EFFECTS OF THE INVENTION

As above described, if the thermoplastic resins include aromatic rings or complex rings therein and are irradiated with ion beams, said resins are cross-linked to improve the heat resistance and the thermal deformability, and the heat-resisting cross-linked electric wire coated with the insulating layer formed of such resins superior in thermal deformability can be obtained by the use of comparatively inexpensive resins.

What is claimed is:

1. A method of making a heat-resistant coated electrically conductive wire, which comprises the steps of:

forming an insulating coating of one thermoplastic resin or a plurality of thermoplastic resins containing aromatic rings or complex rings, which resin or resins are not cross-linkable alone by electron beams, on an electrically conductive wire, and subjecting the insulating coating to irradiation with an accelerated ion beam, wherein the thermoplastic resin or resins are cross-linked to obtain a heat-resistant coated electrically conductive wire, wherein the energy of the accelerated ion beam is in a range of 0.1 MeV to 50 MeV, wherein the dose of said accelerated ion beam is in a range of $1\times10^{11}$ ions/cm$^2$ to $1\times10^{15}$ ions/cm$^2$, and wherein the thermoplastic resin or plurality of resins is selected from the group consisting of polyetheretherketone, polyamide, polyetherimide, polyallylate, polycarbonate and polysulfone.

* * * * *